United States Patent
Böttcher et al.

(10) Patent No.: US 10,281,068 B2
(45) Date of Patent: May 7, 2019

(54) PIPE CONNECTION ARRANGEMENT, HIGH-PRESSURE FLUID LINE SYSTEM OF A DUAL FUEL ENGINE, DUAL FUEL ENGINE AND USE OF A TENSION NUT

(71) Applicant: Siemens Aktiengesellschaft, Munich (DE)

(72) Inventors: Andreas Böttcher, Mettmann (DE); Hartwig Dümler, Köln (DE); Werner Hesse, Haltern am See (DE); Patrick Lapp, Berlin (DE); Joachim-Rene Nuding, Ratingen (DE); Josef Rosenkranz, Rotgen (DE); Sascha Staring, Duisburg (DE); Changsheng Xu, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 406 days.

(21) Appl. No.: 15/021,427

(22) PCT Filed: Aug. 21, 2014

(86) PCT No.: PCT/EP2014/067831
§ 371 (c)(1),
(2) Date: Mar. 11, 2016

(87) PCT Pub. No.: WO2015/039832
PCT Pub. Date: Mar. 26, 2015

(65) Prior Publication Data
US 2016/0223106 A1 Aug. 4, 2016

(30) Foreign Application Priority Data
Sep. 20, 2013 (EP) ..................... 13185330

(51) Int. Cl.
*F16L 19/025* (2006.01)
*F23K 5/14* (2006.01)
(Continued)

(52) U.S. Cl.
CPC ............ *F16L 19/025* (2013.01); *F02C 7/222* (2013.01); *F02C 9/40* (2013.01); *F16L 19/0212* (2013.01);
(Continued)

(58) Field of Classification Search
CPC .......................... F16L 19/025; F16L 19/0231
(Continued)

(56) References Cited

U.S. PATENT DOCUMENTS 2,033,409 A * 3/1936 Wilkinson .............. E21B 17/06
285/354
4,802,695 A * 2/1989 Weinhold ............ F16L 19/0206
285/354

(Continued)

FOREIGN PATENT DOCUMENTS

CN     2041757 U     7/1989
CN   102269303 A    12/2011
(Continued)

OTHER PUBLICATIONS

CN Office Action dated Jan. 4, 2018, for CN patent application No. 201480051784.9.
(Continued)

*Primary Examiner* — David Bochna
(74) *Attorney, Agent, or Firm* — Beusse Wolter Sanks & Maire

(57) ABSTRACT

A pipe connection arrangement in a high-pressure fluid line system of a dual fuel engine, having first pipe element with outer sealing cone and conical shoulder adjoining the cone, having further pipe element with inner sealing cone and (Continued)

external thread, having a screw nut element with clamping sleeve region having inner clamping cone and threaded sleeve region having internal thread. The outer sealing cone of the first pipe element is arranged in the inner sealing cone of the further pipe element and the internal thread of the screw nut element is screwed on the external thread of the further pipe element. The inner clamping cone of the screw nut element is pulled against the conical shoulder of the first pipe element such that the outer and inner sealing cones are clamped with one another in a sealing manner, wherein the threaded sleeve region of the screw nut element is conical.

10 Claims, 3 Drawing Sheets

(51) Int. Cl.

| | |
|---|---|
| F23R 3/28 | (2006.01) |
| F23R 3/36 | (2006.01) |
| F16L 19/02 | (2006.01) |
| F16L 51/00 | (2006.01) |
| F02C 7/22 | (2006.01) |
| F02C 9/40 | (2006.01) |

(52) U.S. Cl.
CPC .............. F16L 51/00 (2013.01); F23K 5/14 (2013.01); F23R 3/283 (2013.01); F23R 3/36 (2013.01); F05D 2250/232 (2013.01)

(58) Field of Classification Search
USPC .................................................. 285/354, 386
See application file for complete search history.

(56) References Cited

U.S. PATENT DOCUMENTS

| | | | | | |
|---|---|---|---|---|---|
| 5,060,988 | A | * | 10/1991 | Williamson | .......... F16L 19/025 |
| | | | | | 285/354 |
| 5,263,312 | A | * | 11/1993 | Walker | ................. F16L 19/005 |
| | | | | | 285/13 |
| 5,350,200 | A | * | 9/1994 | Peterson, IV | ....... F16L 19/0225 |
| | | | | | 285/353 |
| 5,494,320 | A | * | 2/1996 | Cerruti | ................ F16L 19/0225 |
| | | | | | 285/386 |
| 5,725,259 | A | | 3/1998 | Dials | |
| 5,890,746 | A | * | 4/1999 | Mueller | ................ F16L 19/025 |
| | | | | | 285/359 |
| 6,487,860 | B2 | * | 12/2002 | Mayersky | ............... F02C 7/222 |
| | | | | | 285/386 |
| 9,903,514 | B2 | * | 2/2018 | Bottcher et al. | ...... F16L 19/025 |
| 2004/0094959 | A1 | * | 5/2004 | Shemtov | ............... F16L 19/025 |
| | | | | | 285/354 |
| 2010/0140920 | A1 | | 6/2010 | Kloss et al. | |
| 2011/0175349 | A1 | | 7/2011 | Dallas et al. | |
| 2011/0197589 | A1 | | 8/2011 | Khosla et al. | |
| 2013/0049355 | A1 | | 2/2013 | Weinhold | |
| 2013/0074946 | A1 | | 3/2013 | Ramier et al. | |
| 2014/0152001 | A1 | | 6/2014 | Schippers et al. | |
| 2017/0350357 | A1 | * | 12/2017 | Touchette | ........... F16L 19/0225 |

FOREIGN PATENT DOCUMENTS

| | | |
|---|---|---|
| CN | 202195187 U | 4/2012 |
| CN | 202195817 U | 4/2012 |
| CN | 203115333 U | 8/2013 |
| DE | 3043698 A1 | 6/1981 |
| DE | 3743170 C1 | 5/1989 |
| DE | 9106441 U1 | 8/1991 |
| DE | 102005026580 B3 | 6/2006 |
| EP | 2565510 A2 | 3/2013 |
| GB | 2064006 A | 6/1981 |
| JP | 2010242712 A | 10/2010 |
| JP | 2011163753 A | 8/2011 |
| WO | 2012131049 A1 | 10/2012 |

OTHER PUBLICATIONS

JP Office Action dated May 8, 2017, for JP patent application No. 2016515391.
CN Office Action dated Nov. 1, 2016, for CN patent application No. 201480051784.9.

* cited by examiner

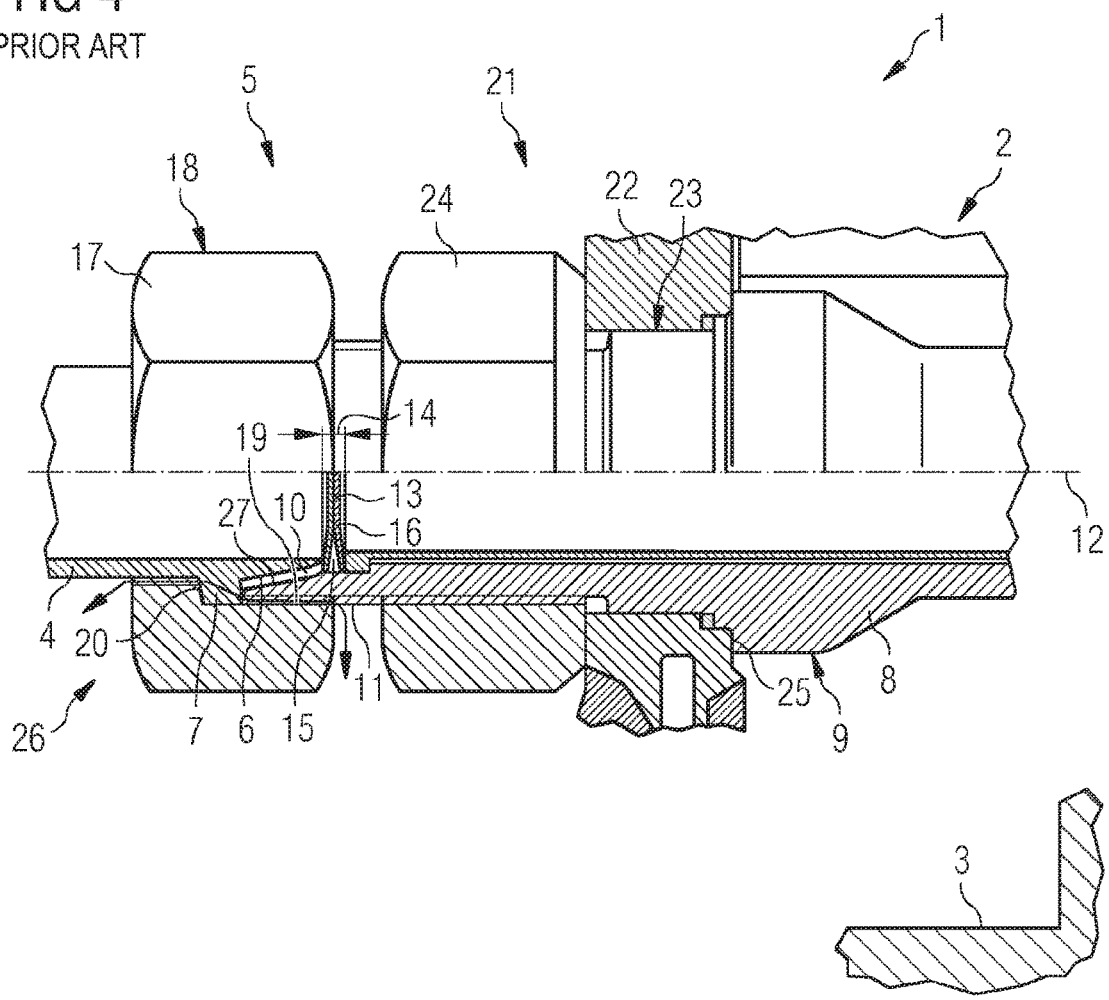

US 10,281,068 B2

PIPE CONNECTION ARRANGEMENT, HIGH-PRESSURE FLUID LINE SYSTEM OF A DUAL FUEL ENGINE, DUAL FUEL ENGINE AND USE OF A TENSION NUT

CROSS REFERENCE TO RELATED APPLICATIONS

This application is the US National Stage of International Application No. PCT/EP2014/067831 filed Aug. 21, 2014, and claims the benefit thereof. The International Application claims the benefit of European Application No. EP13185330 filed Sep. 20, 2013. All of the applications are incorporated by reference herein in their entirety.

FIELD OF INVENTION

The invention relates to a pipe connection arrangement, which is arranged in a high-pressure fluid line system of a dual fuel engine, comprising a first pipe element having an outer sealing cone and having a conical shoulder adjoining said cone, comprising a further pipe element having an inner sealing cone and an external thread, comprising a screw nut element having a clamping sleeve region that has an inner clamping cone and having a threaded sleeve region that has an internal thread, in which the outer sealing cone of the first pipe element is arranged at least partially in the inner sealing cone of the further pipe element and in which the internal thread of the screw nut element is screwed on the external thread of the further pipe element, with the result that the inner clamping cone of the screw nut element is pulled against the conical shoulder of the first pipe element in such a way that the outer sealing cone and the inner sealing cone are clamped to one another in a sealing manner.

The invention furthermore relates to a high-pressure fluid line system having a pipe connection arrangement.

The invention furthermore relates to a dual fuel engine having a gas turbine, which is connected to a high-pressure fluid line system that has at least one pipe connection arrangement.

BACKGROUND OF INVENTION

Pipe connection arrangements of the type in question are known especially in connection with high-pressure gas lines, in which pipe conduit elements are connected to one another by a screwed joint or to connection stub elements of a combustion engine, in particular a dual fuel engine.

It has been found that these screwed joints can begin to leak. As a result, fuels, such as gas or oil, can escape in an uncontrolled manner from a corresponding fluid line system, in particular from a high-pressure fluid line system, and cause damage.

In order to prevent the risk of such unintentional loosening of the screwed joints, a cone clamping system is used, which is integrated into the union nut of the screwed joint. In this cone clamping system, the ends of the pipe conduit elements or of the connection stub elements are of conical configuration. In addition, the union nuts of the screwed joints are secured by means of a locknut system in order to increase the preload in the union nut. An illustrative description of such an embodiment from the prior art can be found in German Utility Model DE 91 06 441, for instance.

Moreover, there is often the problem that screwed joints of this kind are situated in areas of the system which are accessible only with difficulty, e.g. on a burner support flange of a gas turbine system, which is extremely difficult to reach from outside, thereby increasing the risk that such screwed joints will not be tightened properly.

A prior-art pipe connection arrangement 1 of the type in question for a high-pressure gas line system 2 of a dual fuel engine 3 comprising a gas turbine (not shown) is shown in FIG. 4. On the one hand, this pipe connection arrangement 1 has a pipe element 4 having a connection end 5, which comprises an outer sealing cone 6 and a conical shoulder 7. On the other hand, the pipe connection arrangement 1 has a further pipe element 8 in the form of a connection stub element 9 of the dual fuel engine 3, said element comprising an inner sealing cone 10 and an external thread 11 at the end. The pipe element 4 and the further pipe element 8 are inserted one into the other along a central longitudinal axis 12 of the pipe connection arrangement 1, with the result that the outer sealing cone 6 of the pipe element 4 rests in positive engagement on the inner sealing cone 10. Also inserted into the further pipe element 8 is an inner pipe component 13, wherein the inner pipe component 13 is spaced apart from the first pipe element 4 with a spacing 14, giving rise to a gap 15. A seal element 16 is inserted in the gap 15. The two pipe elements 4 and 8 of the pipe connection arrangement 1 are clamped to one another in the direction of the central longitudinal axis 12 by means of a screw nut element 17 in the form of a union nut 18. For this purpose, the union nut 18 is pushed onto the first pipe element 4 and screwed onto the external thread 11 of the further pipe element 8 by means of its internal thread 19. During this process, an inner clamping cone 20 of the union nut 18 comes into effective contact with the conical shoulder 7 of the first pipe element 4. The further the union nut 18 is screwed onto the further pipe element 8, the further the first pipe element 4 is taken along in the direction of the further pipe element 8 by the inner clamping cone 20 of the union nut 18 until, ultimately, the outer sealing cone 6 of the first pipe element 4 is clamped to the inner sealing cone 8 of the further pipe element 8 with the desired preloading force. The pipe connection arrangement 1 is furthermore fixed on a burner support flange 22 by means of a bulkhead union 21, wherein the further pipe element 8 is passed through a bore 23 in the burner support flange 22. The bulkhead union 21 comprises a nut 24, which is likewise screwed onto the external thread 11 of the further pipe element 8. The further pipe element 8 has a shoulder 25, against which the burner support flange 22 is clamped by means of the nut 24. The pipe connection arrangement 1 known from the prior art and shown in FIG. 4 is thus embodied as a cone clamping system 26 with a screwed joint (union nut), wherein good leaktightness can be achieved by virtue of the preloading force introduced into the pipe connection arrangement 1 by the union nut 18.

In general, the components of such screwed joints remain connected to one another firmly and therefore also leaktightly as long as the cone clamping system 26, in particular the outer sealing cone 6 and the inner sealing cone 10 thereof, and the union nut 18 are at approximately the same temperature. This is the case especially when a corresponding system is being operated in the steady-state mode.

However, relatively large temperature fluctuations can occur briefly, especially in dual fuel engines 3, if a change of fuel is carried out, i.e. there is a switch between a supply of oil and a supply of gas. Owing to the fact that transiently cold gas is briefly introduced through a pipe connection arrangement of the type in question for a fuel line, the cone clamping system 26, in particular the outer sealing cone 6 and inner sealing cone 10 thereof, can cool down by a critical amount and contract in such a way that the preload of the union nut 18, which is still warmer, is not sufficiently high to keep the outer sealing cone 6 and the inner sealing cone 10 compressed axially to give a sufficient sealing action. The screwed joint is simply loosened and leaks 27 occur. In combination with vibrations in the system, e.g. those due to less smooth combustion, the pipe connection arrangement 1 may become even looser due to shaking, with the result that it may still be leaky even when the prevailing temperature conditions at said arrangement are once again uniform.

SUMMARY OF INVENTION

It is an object of the invention to develop a pipe connection arrangement of the type in question to overcome at least the disadvantages mentioned above.

The object of the invention is achieved by a pipe connection arrangement, which is arranged in a high-pressure fluid line system of a dual fuel engine, comprising a first pipe element having an outer sealing cone and having a conical shoulder adjoining said cone, comprising a further pipe element having an inner sealing cone and an external thread, comprising a screw nut element having a clamping sleeve region that has an inner clamping cone and having a threaded sleeve region that has an internal thread, in which the outer sealing cone of the first pipe element is arranged at least partially in the inner sealing cone of the further pipe element and in which the internal thread of the screw nut element is screwed on the external thread of the further pipe element, with the result that the inner clamping cone of the screw nut element is pulled against the conical shoulder of the pipe element in such a way that the outer sealing cone and the inner sealing cone are clamped to one another in a sealing manner, wherein the threaded sleeve region of the screw nut element is of conical configuration.

The conically configured threaded sleeve region advantageously makes the screwed joint on the pipe connection arrangement significantly more elastic, thereby making it possible to achieve an extremely good preload on the pipe connection arrangement. The screwed joint according to the invention thus differs from the screwed joints known from the prior art, in particular from the screwed joint described in German Utility Model DE 91 06 441.

Through the elastic effect, the conical shape of the screw nut element concerned always ensures that the pressure on the sealing seat is retained at all times as the cone clamping system is drawn together. The preload produced during assembly is thus retained even with differential thermal expansion.

On the one hand, the screw nut element concerned is distinguished by the threaded sleeve region and, on the other hand, by the clamping sleeve region, which are arranged adjacent to one another in the longitudinal direction of the pipe connection arrangement, i.e. in the direction of the central longitudinal axis of the pipe connection arrangement. In contrast to the threaded sleeve region, no internal thread is provided on the clamping sleeve region, the internal clamping cone, on which the conical shoulder of the first pipe element is supported, being provided instead.

It is thus advantageous if the screw nut element concerned is designed as a tension nut since a tension nut has inherently good elastic properties.

The object of the invention is therefore also achieved by use of a tension nut on a pipe connection arrangement of a high-pressure fluid line system of a dual fuel engine to maintain a sufficient preloading force of a screwed joint of the pipe connection arrangement.

The use of a tension nut significantly reduces the risk that the screwed joint will accidentally be loosened if a higher temperature gradient from the outside inward briefly arises at the pipe connection arrangement. This can occur especially when there is a change of fuel in a high-pressure fluid line system of a dual fuel engine.

The screw nut element proposed also offers the advantage of mitigating rapid changes in loads, referred to as alternating stress and load shocks, by virtue of the expansion which is now possible.

Thus, the object of the invention is also achieved by a high-pressure fluid line system having a pipe connection arrangement, wherein the high-pressure fluid line system comprises a pipe connection arrangement in accordance with one of the features described.

The use of the pipe connection arrangement concerned makes the high-pressure fluid line system significantly less susceptible in respect of temperature changes or fluctuations, thereby reducing the risk of accidental loosening of a screwed joint, especially on dual fuel engines.

For these reasons too, the object of the invention is likewise achieved by a dual fuel engine having a gas turbine, which is connected to a high-pressure fluid line system that has at least one pipe connection arrangement, wherein the dual fuel engine comprises a pipe connection arrangement or a high-pressure fluid line system in accordance with one of the features described here.

In terms of design, the screw nut element is simple to produce with very good elastic properties if the threaded sleeve region has a conical outer contour.

Advantageous axial expansion properties of the screw nut element in the direction of the central longitudinal axis of the pipe connection arrangement can be achieved if the threaded sleeve region has a variable wall cross section in the longitudinal direction of the screw nut element.

A particularly advantageous variant embodiment envisages that the threaded sleeve region and the external thread of the further pipe element are configured and are in operative connection with one another in such a way that the threaded sleeve region and an end region of the further pipe element, said end region comprising the external thread, can be deformed in the same sense.

If the threaded sleeve region and the external thread corresponding thereto are deformable in the same sense, in particular in accordance with the temperature, it is possible reliably to ensure that a number of threads are always in engagement with one another, irrespective of the prevailing temperature conditions. This is often not the case with previous pipe connection arrangements known from the prior art, as a result of which these pipe connection arrangements can have leaks in the event of temperature fluctuations.

Moreover, it is advantageous if the threaded sleeve region has an axial deformation capacity increased by more than 20% or by more than 40% over threaded sleeve regions of screw nut elements on pipe connection arrangements of the type mentioned in the preamble.

In the present case, the radial and axial elasticity of the screw nut element is increased by the conical configuration of the screw nut element, which is subject to a load predominantly by tangential stress in the threaded sleeve region. With the conically configured threaded sleeve region, the axial deformation distance can be increased by at least 43%. As a result, a temperature increase or temperature gradient of as much as 300° K approx. would be required to reduce the preload of the pipe connection arrangement according to the invention to zero.

The same applies to the tolerance in respect of the amounts of setting.

In particular, the axial deformation capacity of the threaded sleeve region is at least more than twice the axial deformation capacity of the clamping sleeve region of the screw nut element.

The pipe connection arrangement can be held in a more stable fashion, particularly in a high-pressure fluid line system, if it is fixed on a housing component or the like by means of a bulkhead union.

Thus, it is advantageous if the further pipe element has a threaded shoulder of a bulkhead union thread arranged axially adjacent to the external thread.

Ideally, the same external thread can be used for the screw nut element and the nut of the bulkhead joint.

The pipe connection arrangement concerned can be embodied in a particularly advantageous way if the further pipe element is a pre-mixing gas pipe element or a connection stub element on the combustion engine.

Moreover, the pipe connection arrangement can manage without an additional anti-rotation safeguard, thus being self-locking.

In addition, the pipe connection arrangement according to the invention offers the benefit that it is not only a thread which bears the prestressing load and that significantly more uniform distribution on the screwed joint can be achieved. Moreover, elastic clamping with transitional ranges can be achieved, i.e. not just the "fixed" and "loose" states. Furthermore, conventional cone clamping systems can be retained. In addition, no further retention measures are required. What is more, two-dimensional support behavior and more uniform load distribution in the thread can be achieved. The pipe connection arrangement according to the invention also offers simple construction, simple production, simple installation and consequently also a very low-cost solution.

BRIEF DESCRIPTION OF THE DRAWINGS

An embodiment of the pipe connection arrangement according to the invention is explained below with reference to the attached schematic drawings, in which:

FIG. 4 shows a prior-art pipe connection arrangement of the type in question for a high-pressure gas line system of a gas turbine.

DETAILED DESCRIPTION OF INVENTION

Figure 1:
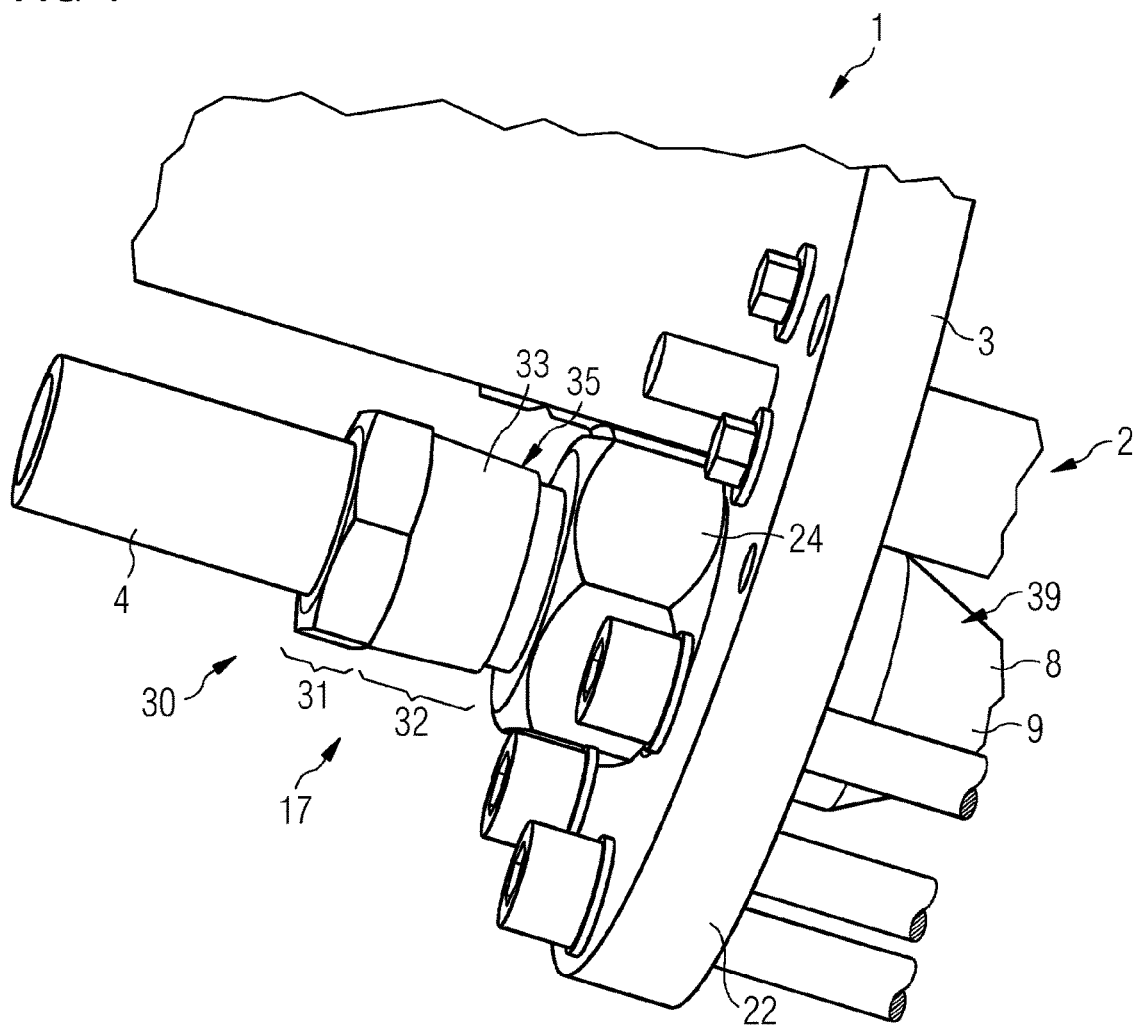
FIG. 1 shows a schematic perspective view of a pipe connection arrangement having a screw nut element designed as a tension nut comprising a conically configured threaded sleeve region.
Figure 2:
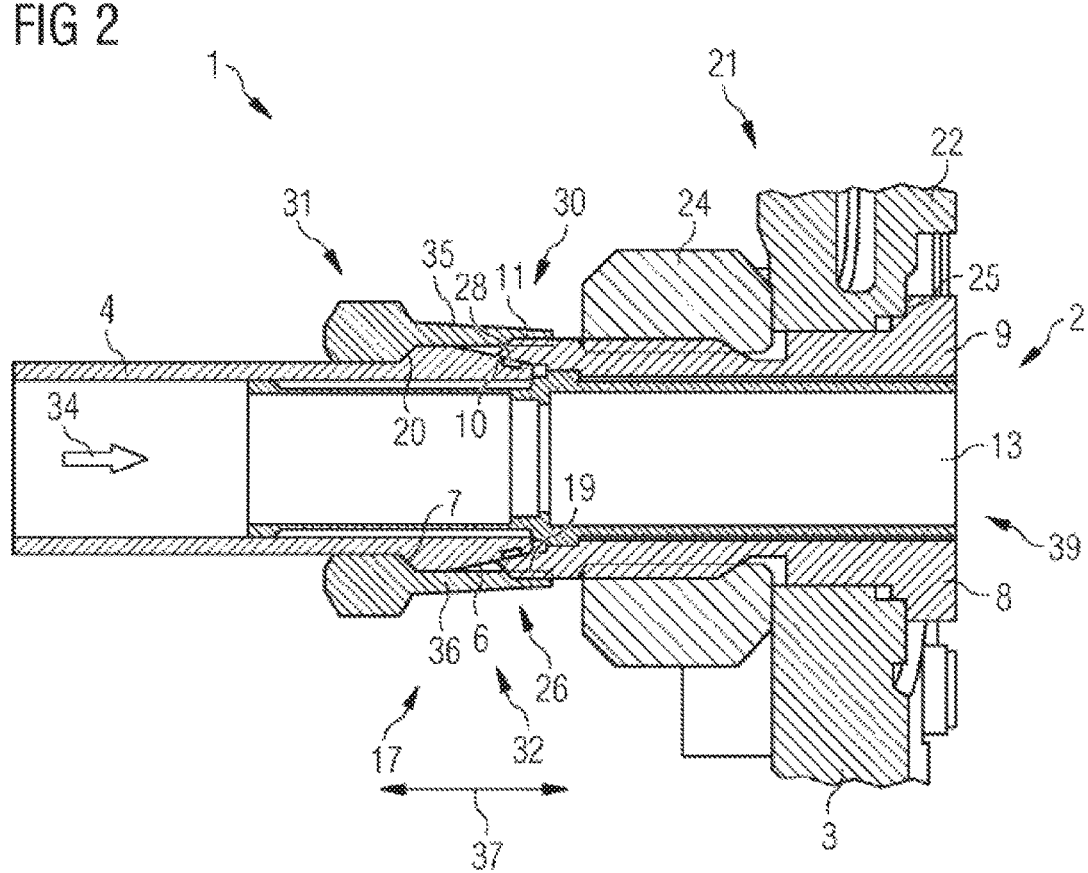
FIG. 2 shows a schematic longitudinal section through the pipe connection arrangement from FIG. 1.

The pipe connection arrangement 1 shown in FIGS. 1 and 2 is incorporated into a high-pressure fluid line system 2 of a dual fuel engine 3.

The pipe connection arrangement 1 essentially comprises a first pipe element 4, a further pipe element 8 and a screw nut element 17 in order to connect the two pipe elements 4 and 8 firmly and sealingly to one another by means of a screwed joint 30.

As is readily apparent from the illustration in FIG. 2, the first pipe element 4 has an outer sealing cone 6 and a conical shoulder 7. The further pipe element 8 has an inner sealing cone 10 and an external thread 11. And the screw nut element 17 is distinguished by a clamping sleeve region 31 having an inner clamping cone 20 and by a threaded sleeve region 32 having an internal thread 19.

In this arrangement, the outer sealing cone 6 of the first pipe element 4 is inserted at least partially into the inner sealing cone 10 of the further pipe element 8. Moreover, the internal thread 19 of the screw nut element 17 is screwed onto the external thread 11 of the further pipe element 8, as a result of which the inner clamping cone 20 of the screw nut element 17 is pulled against the conical shoulder 7 of the first pipe element 4 in such a way that the outer sealing cone 6 and the inner sealing cone 10 are clamped sealingly to one another, thereby providing a cone clamping system 26. A circumferential groove 28, in which a soft sealing element (not shown here) can be placed, is furthermore cut into the outer sealing cone 6 in order to improve the leaktightness of the cone clamping system 26. Thus, it is possible to dispense with a sealing means between the first pipe element 4 and an inner pipe part 13 inserted into the further pipe element 8.

According to the invention, the threaded sleeve region 32 of the screw nut element 17 is of conical configuration in order, with regard to the cone clamping system 26 explained above, to provide in this way a screwed joint 30 having a high preload in the pipe connection arrangement 1 that is always sufficient.

Thus, in the sense according to the invention, the screw nut element 17 forms, in particular, a tension nut 33 which, owing to the special design of the threaded sleeve region 32, can produce a high preload on the pipe connection arrangement 1 that is always sufficient, even when the cone clamping system 26 contracts sharply owing to cooling by a gas 34 that has been introduced into the pipe elements 4 and 8 and is transiently cold, while the screw nut element 17 does not likewise cool down sharply within a brief period.

In this arrangement, the threaded sleeve region 32 of the screw nut element 17 has a conical outer contour 35, as a result of which the wall 36 of the screw nut element 17 is very elastic and expandable in this threaded sleeve region 32.

Figure 3:
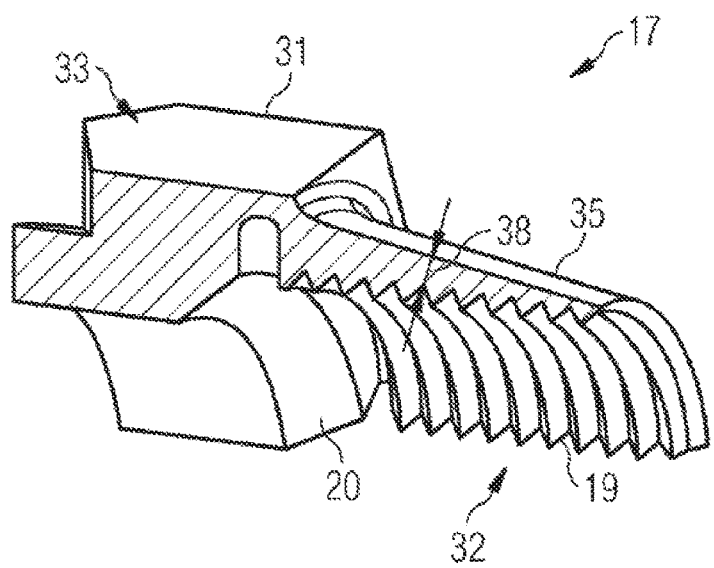
FIG. 3 shows a schematic partial detail view of the tension nut from FIGS. 1 and 2.

According to the illustration in FIGS. 2 and 3, it is readily apparent that the threaded sleeve region 32 has a wall cross section 38 that varies in the longitudinal direction 37 of the screw nut element 17.

In this illustrative embodiment, the further pipe element 8 is a pre-mixing gas pipe element 39, which is designed as a connection stub element 9 of the dual fuel engine 3.

The further pipe element 8 is fixed on a burner support flange 22 of the dual fuel engine 3 by means of a bulkhead union 21. For this purpose, a further nut 24 is screwed onto the external thread 11 and ultimately fixes the burner support flange 22 against a shoulder 25 of the further pipe element 8.

According to the illustration in FIG. 3, the screw nut element 17 is once again shown partially in detail, and it is clearly apparent how the more solid clamping sleeve region 31 is adjoined by the significantly thinner and furthermore conical threaded sleeve part 32.

Although the invention has been illustrated and described more specifically in detail by means of the preferred illustrative embodiment, the invention is not restricted by this disclosed illustrative embodiment, and other variations can be derived therefrom by a person skilled in the art without exceeding the scope of protection of the invention.

The invention claimed is:

1. A pipe connection arrangement for a high-pressure fluid line system of a dual fuel engine, comprising a first pipe element having an outer sealing cone and having a conical shoulder adjoining said cone, a further pipe element having an inner sealing cone and an external thread, a screw nut element having a clamping sleeve region that has an inner clamping cone and having a threaded sleeve region that has an internal thread, wherein the outer sealing cone of the first pipe element is arranged at least partially in the inner sealing cone of the further pipe element and wherein the internal thread of the screw nut element is screwed on the external thread of the further pipe element, such that the inner clamping cone of the screw nut element is pulled against the conical shoulder of the first pipe element such that the outer sealing cone and the inner sealing cone are clamped to one another in a sealing manner, wherein the threaded sleeve region of the screw nut element is thinner than the clamping sleeve region and is of conical configuration such that a base of the conical configuration at a proximal end abuts the clamping sleeve region and the conical configuration tapers from the base toward a distal end forming a conical outer contour.

2. The pipe connection arrangement as claimed in claim 1, wherein the threaded sleeve region has a variable wall cross section in the longitudinal direction of the screw nut element, and wherein the variable wall cross section becomes thinner toward the distal end of the threaded sleeve region.

3. The pipe connection arrangement as claimed in claim 1, wherein the threaded sleeve region and the external thread of the further pipe element are configured and are in operative connection with one another such that the threaded sleeve region and an end region of the further pipe element, said end region comprising the external thread, are configured to be cooperatively deformed to about the same extent in response to a temperature fluctuation.

4. The pipe connection arrangement as claimed in claim 1, wherein the further pipe element is a pre-mixing gas pipe element or a connection stub element on the dual fuel engine.

5. A high-pressure fluid line system having a pipe connection arrangement, comprising:

a pipe connection arrangement as claimed in claim 1.

6. A dual fuel engine having a gas turbine, which is connected to a high-pressure fluid line system that has at least one pipe connection arrangement, comprising:

a pipe connection arrangement or a high-pressure fluid line system as claimed in claim 1.

7. The pipe connection arrangement as claimed in claim 1, wherein an axial deformation capacity of the threaded sleeve region is at least more than twice that of the clamping sleeve region of the screw nut element due to the threaded sleeve region being thinner than the clamping sleeve region.

8. A tension nut for use on a pipe connection arrangement of a high-pressure fluid line system of a dual fuel engine to obtain a sufficient preloading force of a screwed joint of the pipe connection arrangement, the tension nut comprising:

a screw nut element having a clamping sleeve region that has an inner clamping cone and having a threaded sleeve region that has an internal thread, and wherein the threaded sleeve region of the screw nut element is thinner than the clamping sleeve region and is of conical configuration such that a base of the conical configuration at a proximal end abuts the clamping sleeve region and the conical configuration tapers from the base toward a distal end forming a conical outer contour.

9. The tension nut as claimed in claim 8, wherein the threaded sleeve region has a variable wall cross section in a longitudinal direction of the tension nut, wherein the variable wall cross section becomes thinner toward the distal end of the threaded sleeve region.

10. The tension nut as claimed in claim 8, wherein an axial deformation capacity of the threaded sleeve region is at least more than twice that of the clamping sleeve region due to the threaded sleeve region being thinner than the clamping sleeve region.

* * * * *